No. 829,158. PATENTED AUG. 21, 1906.
T. KEEPFER.
COMBINED HACK AND WOOD SAW.
APPLICATION FILED FEB. 27, 1906.
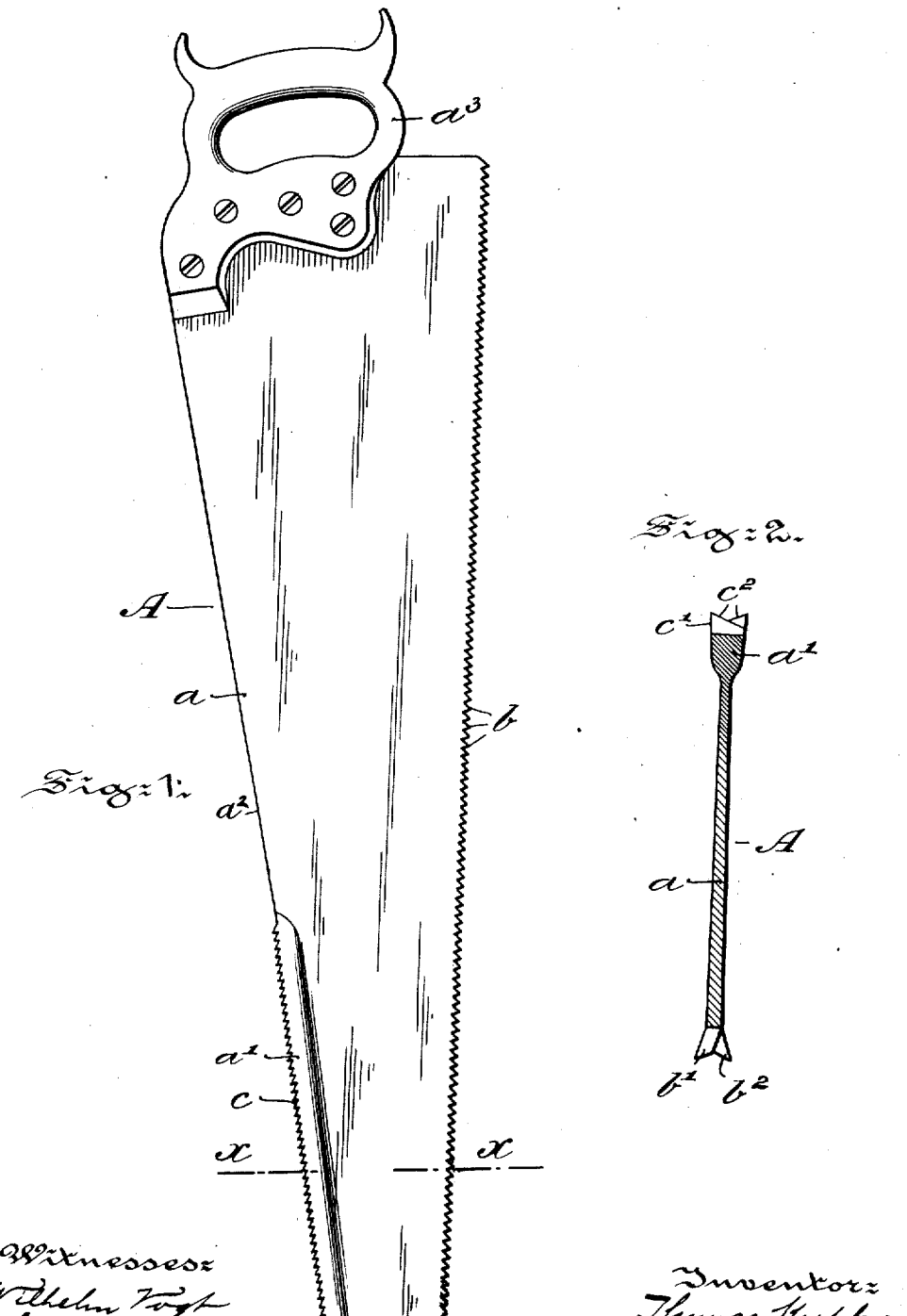

UNITED STATES PATENT OFFICE.

THOMAS KEEPFER, OF PHILADELPHIA, PENNSYLVANIA.

COMBINED HACK AND WOOD SAW.

No. 829,158.   Specification of Letters Patent.   Patented Aug. 21, 1906.

Application filed February 27, 1906. Serial No. 303,153.

*To all whom it may concern:*

Be it known that I, THOMAS KEEPFER, a citizen of the United States, residing at the city of Philadelphia, in the county of Philadelphia and State of Pennsylvania, have invented certain new and useful Improvements in a Combined Hack and Wood Saw, of which the following is a specification.

My invention has relation to a wood-saw of the class used by carpenters, and in such connection it relates more particularly to the construction and formation of the blade and of the teeth arranged in both edges of the same to render the saw suitable for cutting wood as well as metal.

The principal objects of my invention are, first, to provide a saw for the use of carpenters which will permit of the cutting of nails or other metal objects embedded or otherwise unremovably secured to wood or to an article made of wood which is to be cut or repaired; second, to provide for this purpose a portion of one of the edges of the blade with metal-cutting teeth and with a toothless portion and to harden the portion of the edge carrying the metal-cutting teeth to permit the teeth to offer greater resistance to wear, and, third, to reinforce the blade at the portion carrying the metal-cutting teeth to strengthen the blade at this portion and prevent bending of the same when used to cut metal.

The nature and scope of my invention will be more fully understood from the following description, taken in connection with the accompanying drawings, forming part hereof, in which—

Figure 1 is a view illustrating in side elevation a hand wood-saw provided at its free end with metal-cutting teeth embodying features of my present invention; and Fig. 2 is a sectional view, enlarged, on the line $x$ $x$ of Fig. 1.

Referring to the drawings, A represents a saw such as is commonly used by carpenters, which, in addition to the wood-cutting teeth $b$, arranged in one edge of the blade $a$, is also provided with metal-cutting teeth $c$, arranged in the edge opposite to the edge carrying the teeth $b$. The teeth $c$ are preferably arranged in a reinforced portion $a'$ of the blade $a$, which terminates a certain distance from the free end thereof and tapers slightly in cross-section toward the teeth $b$, which in the present instance are bent outward to form cross-cut teeth $b'$ and $b^2$. The blade $a$ throughout its reinforced portion $a'$ and a portion adjacent thereto is hardened, while the other portions thereof remain soft and pliable. However, it should be understood that the edge of the saw provided with the wood-cutting teeth $b$ is hardened in a well-understood manner to render such wood-cutting teeth suitable for the purposes and thus more effective for resisting wear. The special hardening of a small portion of the blade $a$ to a greater degree diminishes liability to breakage of the blade, which otherwise would occur if the entire blade on one of its edges was so hardened. Prior to the special hardening of the reinforced portion $a'$ the blade $a$ is provided with the metal-cutting teeth $c$, which in the present instance are inclined at $c^2$ in Fig. 2 in a similar manner to the teeth of a certain type of hacksaw. When a metal object is encountered embedded and secured to the wood cut, the blade $a$ is removed therefrom, and by turning and reinserting the blade the metal-cutting teeth $c$ are brought into engagement with the metal object to permit of a speedy cutting of the same. The cut made by the teeth $c$ is preferably of the same width as the cut made by the wood-cutting teeth $b$ to prevent jamming of the blade $a$ in the cut made by the teeth $c$, when the blade is again withdrawn and turned to complete the cutting of the wood by the teeth $b$. The smooth portion $a^2$ of the blade $a$ between the reinforced portion $a'$ and the handle $a^3$ thereof affords a safe engagement for the hand of the operator, and also permits of a stiffening of the blade $a$ by the hand during the cutting of the metal object, while the reinforced portion $a'$ prevents the buckling or bending of the end portion of the blade $a$ at this time.

I claim—

1. A saw, consisting of hardened and unhardened portions, one edge of the saw-blade having a portion specially hardened and a portion unhardened, the other entire edge being less hardened, the specially-hardened portion being toothed and the adjoining unhardened part of the same edge being untoothed and adapted to be engaged by the operator when the blade is employed to cut metal and the entire less-hardened edge of the blade being toothed.

2. In a saw, a blade having a reinforced and hardened portion and an unhardened portion, the reinforced and specially-hardened portion being arranged at one of the edges of the blade and terminating a certain distance from the free end thereof, in an unhardened portion of the edge, the specially-hardened reinforced edge of the blade toothed and adapted to resist bending of the blade in use and the adjoining unhardened edge being adapted to afford a safe engagement of the hand of the operator when the blade is employed to cut metal, and the less-hardened edge of the blade having wood-cutting teeth.

3. In a saw, a blade having a reinforced and hardened portion and an unhardened portion, the reinforced and specially-hardened portion arranged at one of the edges of the blade and tapering in cross-section toward the opposite edge thereof, and merging into the unhardened portion of the edge, the specially-hardened reinforced and tapering edge of the blade being toothed and adapted to resist bending of the free end of the blade, and the adjoining unhardened edge adapted to afford safe engagement of the hand of the operator, when the blade is employed to cut metal and the entire less-hardened edge of the blade having wood-cutting teeth.

In witness whereof I have hereunto set my signature in the presence of two subscribing witnesses.

THOMAS KEEPFER.

Witnesses:
GEO. W. REED,
THOMAS M. SMITH.